Figure 1:
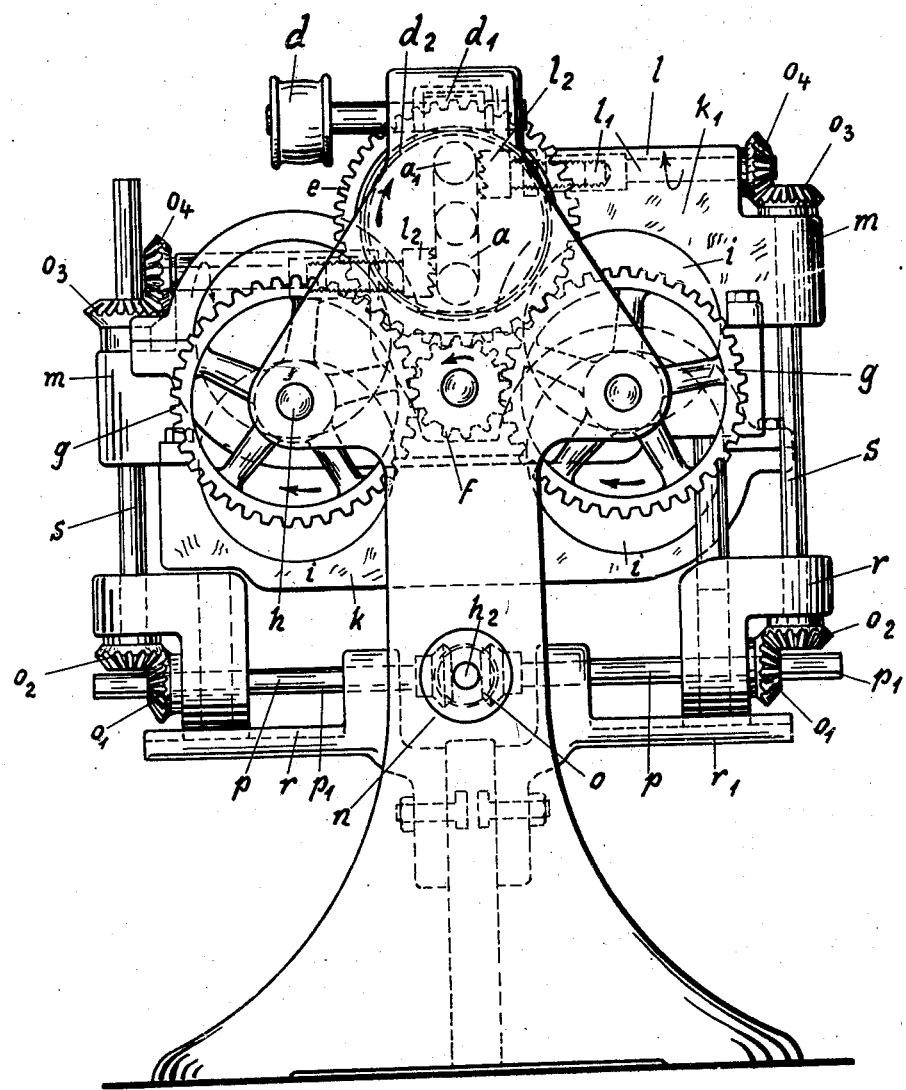

Nov. 18, 1924.

A. THOMAS

MILLING MACHINE

Filed March 13, 1922     3 Sheets—Sheet 1

1,516,219

Witnesses:
Edward Maw
John Smith

Inventor:
August Thomas
By Chatwin & Company
attys.

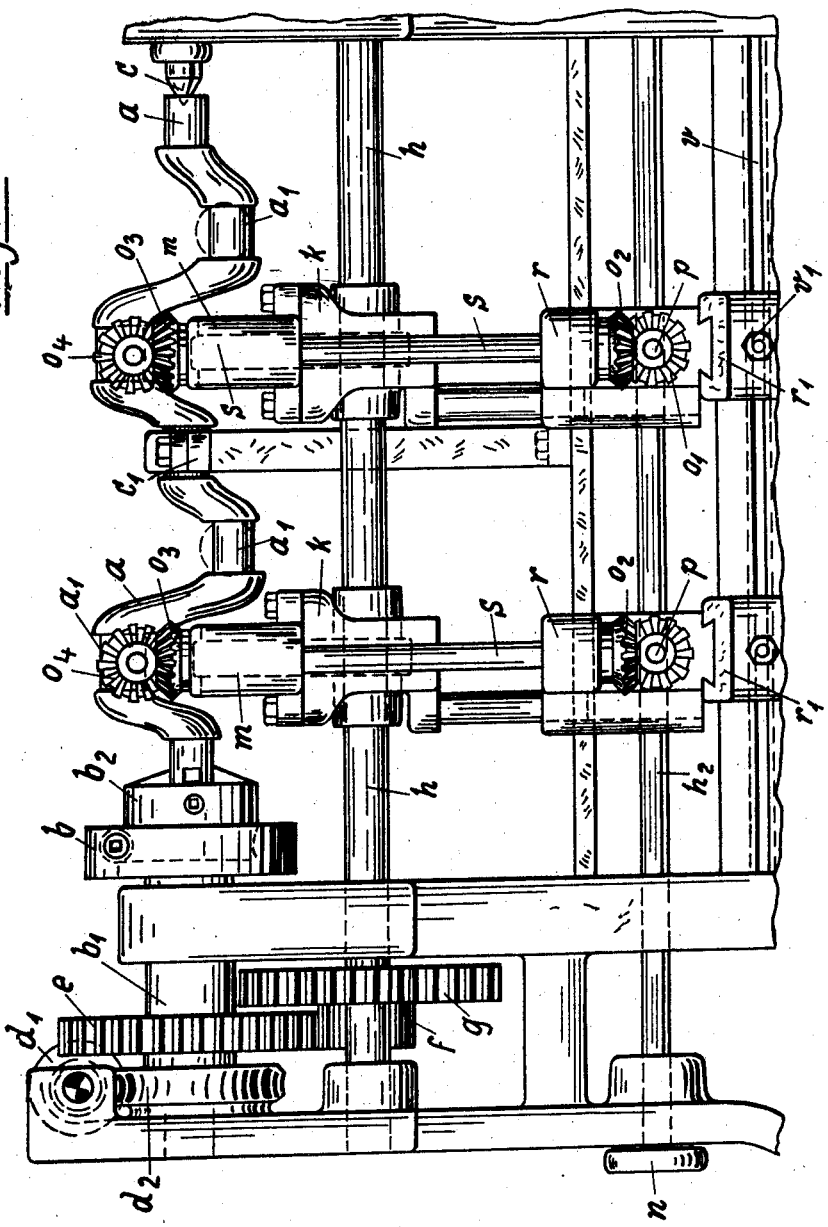

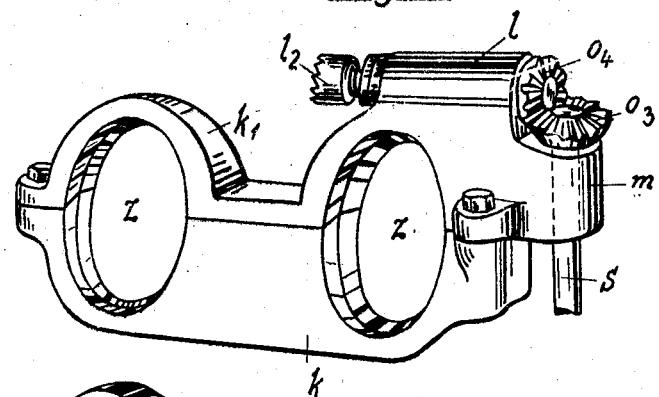
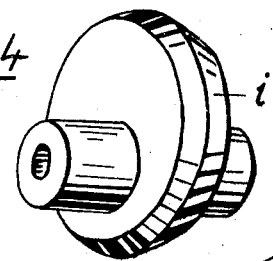
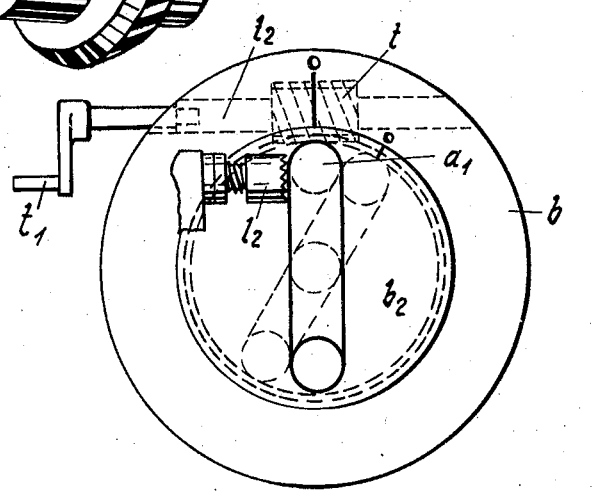

Patented Nov. 18, 1924.

1,516,219

UNITED STATES PATENT OFFICE.

AUGUST THOMAS, OF BERLIN-HERMSDORF, GERMANY, ASSIGNOR TO DEUTSCHE WERKE AKTIENGESELLSCHAFT, OF BERLIN, GERMANY, A CORPORATION OF GERMANY.

MILLING MACHINE.

Application filed March 13, 1922. Serial No. 543,422.

*To all whom it may concern:*

Be it known that I, AUGUST THOMAS, a citizen of the German Republic, residing at Berlin-Hermsdorf, Germany, have invented certain new and useful Improvements in Milling Machines, of which the following is a specification.

This invention relates to a machine for milling crank-shafts, in which the milling cutter is carried in a horizontal and vertical motion in accordance to the motion of the crank.

A prominent feature of my invention consists therein that the driving shaft for the milling cutter is passed through the vertical shank of an angle-shaped slide provided upon a horizontal sliding surface of known construction, transmitting its rotation by means of a system of conical wheels upon a shaft which rotates within the other shank of the slide. Upon this shaft the cutter holder is mounted as well as the conical wheel for the operation of the milling spindle to permit upward and downward motion.

In Figs. 1 to 5 of the accompanying drawing the milling machine according to my present invention is represented in one of its possible forms. Fig. 1 is a side view of a machine with several milling cutters upon both sides for carrying out the milling process upon a multiple-throw crank-shaft, Fig. 2 is a front-view of the machine, Fig. 3 shows the casing for the cutter holder in a perspective view, Fig. 4 shows the eccentrics also in a perspective view and Fig. 5 is a front-view of the jaw-chuck in a somewhat enlarged scale.

The crank-shaft $a$ which shall be submitted to the milling operation is fastened with its one end in the jaw-chuck $b$, upon the spindle $b_1$ in Fig. 2, while the other end is carried by the dead center $c$. Instead of this dead center a jaw-chuck may be employed. In case of long crank-shafts preferably a supporting bearing $c_1$ may be provided about at the center of the crank-shaft. Through the pulley $d$, the worm $d_1$, the worm-wheel $d_2$, the spindle $b_1$ with the jaw-chuck and the crank-shaft $a$ are set in rotation. Furthermore the gear-wheel $e$ is mounted upon the spindle $b_1$, said gear-wheel driving the two gear-wheels $g$ and the shafts $h$ by means of the small gear-wheel $f$. Upon these shafts the two eccentric discs $i$ are provided in the cutter holders which consist of two parts $k$ and $k_1$, said discs rotating in the same phase and having their circumferences shaped to present a triangular cross-section, as shown in the drawing. The cutter holder, which is provided with two bores $z$ for the eccentrics, consists of two parts $k$ and $k_1$, which are held together by screws. At the upper part rests the bearing $l$ for the cutter spindle $l_1$ with the cutter head $l_2$. The upper part $k_1$ is furthermore provided with a projection $m$ having a bore for the vertical shaft $s$. The mechanism for driving the cutter spindle $l$ is as follows:

In the under part of the machine frame there is mounted the shaft $h_2$ which carries the pulley $n$; the shaft $h_2$ passes through the entire length of the machine and is provided with a longitudinal groove. The shaft $h_2$ drives the shafts $p$ positioned in a transverse direction to the machine, through the interposed conical gear-wheels $o$; the shafts $p$ are provided with longitudinal grooves $p_1$. The shafts $p$ pass freely through a bore of the shank of the angle-shaped slide $r$ and carry conical gears $o_1$, which are slidable upon the shafts $p$. The slides $r$ slide in transverse direction of the machine in prismatic guides provided in standards $r_1$ which are mounted upon the machine frame. The standards $r_1$ besides, are mounted slidably in longitudinal direction and can be fixed in the grooves $v$ of the machine frame as can be seen from Fig. 2. For fastening said standards upon the frame the bolts $v'$ may be used. The vertical shaft $s$ with the conical gear $o_2$ fastened thereon is rotatably mounted in the horizontal leg of the slide $r$ and the gear $o_2$ meshes with the slidable conical gear $o_1$ which rests on the shaft $p$. The shaft $s$ is provided throughout its length with a groove and is guided in a bore of the projection $m$ at the cutter holder $k_1$, so that the latter as well as the keyed conical gear $o_3$ may be moved in upward and downward direction. The gear $o_3$ meshes with the gear $o_4$ upon the cutter spindle $l_1$ so that the cutter will rotate if the pulley $n$ is driven.

The jaw-chuck upon the driving spindle $b_1$ is so arranged that the inner jaw disc $b_2$ may be turned with respect to the outer chuck $b$ which rests upon the driving spindle as shown in Fig. 5. The inner disc $b_2$ which takes up the jaws is rotatably mounted in a bore of the disc $b$. The disc carries at the circumference of the part which is held within the chuck a worm wheel meshing with a fixedly mounted worm $t$. The rotation of the worm $t$ is effected by a key $t_1$ which is put upon the end of the worm-shaft $t_2$. Through the rotation of the inner disc $b^2$ the crank-shaft with one or more cranks $a_1$ is rotated, thereby carrying the crank or cranks against one or more milling cutters. By adjusting the jaw-chuck the crank-shaft is carried against the cutter.

The milling of the crank by the machine according to my invention is carried out as follows: The crank-shaft $a$ is mounted in the chuck $b$ and upon the dead-center and the inner disk $b_2$ and therewith the crank $a_1$ is carried toward the head of the cutter by rotating the worm $t$. Thereupon the two driving discs $d$ and $n$ are thrown in and the crank-shaft $a$ as well as the cutters will rotate. The cutter holder $k$ will be simultaneously moved in horizontal and vertical direction in such a manner that the rotating cutter will follow the motion of the crank-shaft and exert a milling action upon the latter.

Having thus described my invention, I claim as new and desire to secure by Letters Patent of the United States:

In a milling machine for crank-shafts the combination of a main driving shaft for axially rotating a crank-shaft, a milling cutter mounted within a cutter holder adapted to follow the rotation of the crank-shaft, said cutter holder comprising an angle-shaped slide, a driving shaft for the milling cutter mounted upon the vertical shank of said slide, a rotatable shaft mounted upon the horizontal shank of said slide, a conical gear interposed between said two shafts, a conical gear for driving the milling cutter, said cutter holder and said latter gear being mounted slidably with respect to said latter shaft.

In testimony whereof I have affixed my signature in presence of two witnesses.

AUGUST THOMAS.

Witnesses:
ERNST DEINRICH,
FRIEDRICH ZERBST.